United States Patent [19]

Ruzic

[11] 4,224,465
[45] Sep. 23, 1980

[54] LABYRINTH PATH MULTIPLE CABLE HOLDER WITH STRAIN RELIEF

[75] Inventor: Hugo Ruzic, Leonberg, Fed. Rep. of Germany

[73] Assignee: International Standard Electric Corporation, New York, N.Y.

[21] Appl. No.: 23,056

[22] Filed: Mar. 22, 1979

[30] Foreign Application Priority Data

Apr. 4, 1978 [DE] Fed. Rep. of Germany ... 7809938[U]

[51] Int. Cl.³ .............................................. H01R 13/58
[52] U.S. Cl. .................................... 174/135; 339/105
[58] Field of Search ....................... 174/65 R, 135, 175; 179/1 PC, 98, 100 R, 100 C, 100 D, 100 L, 179; 339/105

[56] References Cited

U.S. PATENT DOCUMENTS

| 1,039,670 | 9/1912 | Gagnon | 339/105 |
| 2,140,867 | 12/1938 | Wilmot | 339/105 X |
| 2,544,343 | 3/1951 | Miller | 339/105 |
| 3,924,073 | 12/1975 | Brandstatter | 179/100 R X |

FOREIGN PATENT DOCUMENTS

2310366 9/1974 Fed. Rep. of Germany ........... 339/105

*Primary Examiner*—Laramie E. Askin
*Attorney, Agent, or Firm*—John T. O'Halloran; Jeffrey P. Morris

[57] ABSTRACT

On a supporting surface (e.g. in a telephone subset or handset) are ribs arranged along the cable path on alternate sides. They are disposed to form a labyrinth so that several cable paths will result in which up to three cables can be inserted optionally, e.g. two in the same direction and one to the left or right side.

1 Claim, 2 Drawing Figures

LABYRINTH PATH MULTIPLE CABLE HOLDER WITH STRAIN RELIEF

BACKGROUND OF THE INVENTION

The present invention relates to a cable holder with a strain relief for telephone substation sets and the like, which is formed by ribs arranged on alternate sides along the cable path on a supporting surface.

The German Petty Patent (DE-GM) No. 70 11 005 discloses an arrangement for guiding and holding a telephone cord or the like, in which trapezoidal ribs are moulded to the supporting surface, with these ribs being arranged on alternate sides along the cord path. The cords, lines or cables, quite depending on their diameters, extend in a more or less wavy line between the ribs. Considering that with the ribs, the long side of the trapezoid is the top side, there is only a slight danger of a cable slipping out.

It is the object of the invention to provide a simple arrangement for simultaneously guiding and holding several cables in position, safeguarding at the same time a strain relief of the cable as is the case, for example, with cables clamped in position in the usual way with the aid of screw-type clips which, however, involve a considerably higher investment.

This object is achieved by the features set forth in the claims. Advantageous further embodiments are set forth in the claims dependent thereon. The solution according to the present invention offers the advantage that up to three cables can be inserted and held in position simultaneously, with it still being possible, in addition thereto, to lead one cable out of the equipment either on the left or on the right hand side. This advantage is particularly advantageous with respect to the cable connecting a telephone substation set with the handset, as it is desirable to serve lefthanders and righthanders equally well in enabling them to use the telephone substation set. Moreover, the cable may be conducted differently at any time, for example, when attachments, such as secondary earphones or loudspeakers, are to be connected or removed subsequently. Considering that the ribs are appropriately produced simultaneously when injection-moulding the telephone or handset housing, there are involved no additional costs.

BRIEF DESCRIPTION OF THE DRAWINGS

The invention will now be described in greater detail with reference to the accompanying drawings, wherein.

DESCRIPTION OF THE PREFERRED EMBODIMENTS

Figure 1:
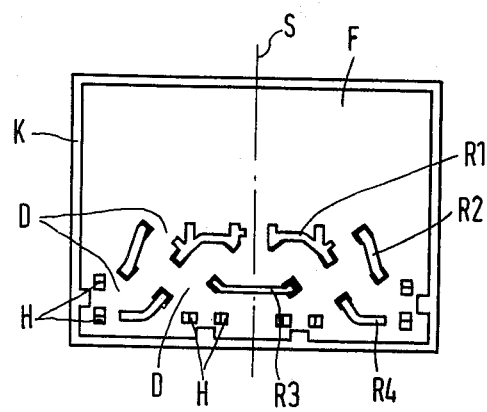
FIG. 1, in a top view, shows the cable guiding chamber of a telephone substation set with the ribs for holding in position several cables.

The cable guiding chamber as shown in the drawing is indicated by the reference K and forms part of e.g. a telephone substation set or a junction box. In the first-mentioned case this chamber is accessible from the bottom side of the set and, in the second case upon removal of the cover. On the base or supporting surface F of this chamber there is provided a number of ribs R which, preferably, are moulded thereto.

The ribs are arranged approximately in two rows which, in the drawings, are shown as horizontal rows, with each being different in outline. The upper row consists of four, and the lower row consists of three ribs. They are arranged mirror-symmetrically in relation to a centre line S extending vertically through the cable guiding chamber K. The two passages D between the ribs of the lower row are arranged almost in the centre between the three passages of the ribs in the upper row.

The inner ribs R1 of the upper row, when looked at from the centre line S, extend first of all horizontally, and are then bent in the downward direction in about their centre, by forming an acute angle. The outer ribs R2 of the upper row are arranged approximately in parallel with the bent parts of the ribs R1.

The centre rib R3 in the lower row extends horizontally. The outer ribs R4 in the lower row at first extend almost in parallel with the ribs R2 slantingly in the downward direction, and then horizontally towards the outside.

Figure 2:
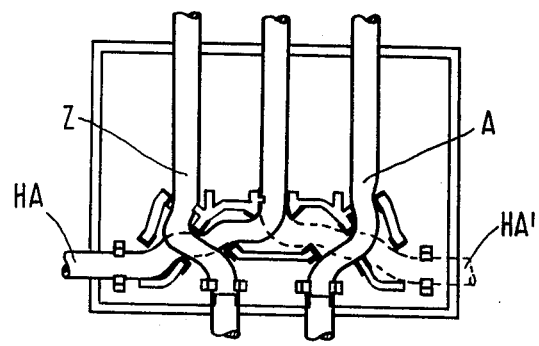
FIG. 2 shows the same chamber as FIG. 1, with the cables inserted.

From this configuration of the ribs there result the various possibilities of conducting the cable as shown in FIG. 2. The three cables HA, A and Z as led out on the top of the set, extend first of all through the three passages D in the upper row of ribs. The cable in the centre, e.g. for the handset, is led out either towards the left (HA) or towards the right (HA') between the two rows of ribs, while the outer cables A (cable for connecting the set) and Z (cable for connecting loudspeaker, secondary earphone, etc.) are inserted in the two passages D of the lower row of ribs.

It is well recognizable that the cables may also be inserted differently, e.g. the cables A or Z may be led out on the side, while the cable HA may be led out in the downward direction.

It is important for the face sides of all ribs R1, R2, R3 and R4 to be so directed that their edges will each time project into the cable path by forming acute angles. In this way there is safeguarded a good strain relief.

In order to prevent the cables from slipping out, or from slipping upwardly through the passages, either inwardly protruding nose-like projections may be provided on the ribs or, as in the given example, similar types of engaging hooks H can be arranged in front of the two lower and the two sideway passages D.

Appropriately, the passages D are designed to have widths which are slightly smaller than the diameters of the cables to be inserted.

What is claimed is:

1. A multiple cable holder with a strain relief, for telephone substation sets and the like, having ribs arranged on alternate sides along a cable path on a supporting surface, comprising:
    rib means arranged to form a labyrinth having a plurality of cable paths and passages, such that one vertical edge on each of the ends of at least three of said ribs projects into the cable path by forming an acute angle, and such that said ribs are arranged in two rows of which the upper row contains three, and of which the lower row contains two passages, with two side-way passages, one being open on the left and the other being open on the right between said two rows; and ahead of said two lower and said two side-way passages there being arranged two oppositely directed engaging hooks for fixing in position a plurality of cables.

* * * * *